United States Patent
Rolf et al.

(10) Patent No.: US 10,553,114 B2
(45) Date of Patent: Feb. 4, 2020

(54) METHOD, APPARATUS, AND COMPUTER PROGRAM PRODUCT FOR PARKING AVAILABILITY ESTIMATION BASED ON PROBE DATA COLLECTION

(71) Applicant: HERE Global B.V., Eindhoven (NL)

(72) Inventors: Daniel Rolf, Berlin (DE); Raul Cajias, Berlin (DE)

(73) Assignee: HERE Global B.V., Eindhoven (NL)

( * ) Notice: Subject to any disclaimer, the term of this patent is extended or adjusted under 35 U.S.C. 154(b) by 207 days.

(21) Appl. No.: 15/240,710

(22) Filed: Aug. 18, 2016

(65) Prior Publication Data

US 2018/0053417 A1  Feb. 22, 2018

(51) Int. Cl.
*G08G 1/14* (2006.01)
*H04W 4/024* (2018.01)

(52) U.S. Cl.
CPC ............ *G08G 1/143* (2013.01); *H04W 4/024* (2018.02)

(58) Field of Classification Search
CPC combination set(s) only.
See application file for complete search history.

(56) References Cited

U.S. PATENT DOCUMENTS

| | | |
|---|---|---|
| 8,797,187 B2 | 8/2014 | Harber et al. |
| 2010/0318290 A1* | 12/2010 | Kaplan ................ G01C 21/30 701/426 |
| 2012/0135746 A1 | 5/2012 | Mohlig et al. |
| 2016/0163197 A1 | 6/2016 | Levy et al. |
| 2017/0046956 A1 | 2/2017 | Gaebler et al. |
| 2017/0176211 A1 | 6/2017 | Belzner et al. |

FOREIGN PATENT DOCUMENTS

| | | |
|---|---|---|
| WO | WO 2016/034333 A1 | 3/2016 |
| WO | WO 2016/071512 A1 | 5/2016 |

OTHER PUBLICATIONS

Montini, Lara et al., "Searching for Parking in GPS Data"; 12th Swiss Transport Research Conference, Monte Verita, Ascona, May 2-4, 2012; 29 pages.
Kaplan, Sigal; "Exploring en-route Parking Type and Parking-Search Route Choice: Decision Making Framework and Survey Design"; [online] [retrieved from the Internet Dec. 10, 2016]. Retrieved from URL <http://www.icmconference.org.uk/index.php/icmc/ICMC2011/paper/viewFile/298/160>. 19 pages.
In re: Smith; U.S. Appl. titled Method and Apparatus for Providing Parking Availability Detection Based on Vehicle Trajectory Information; U.S. Appl. No. 14/825,756, filed Aug. 13, 2015.

* cited by examiner

*Primary Examiner* — Kabir A Timory
(74) *Attorney, Agent, or Firm* — Alston & Bird LLP

(57) ABSTRACT

A method, apparatus, and computer program product are provided for predicting parking availability for one or more road segments based on the map-matched probe data points. A method may include: receiving probe data points from a vehicle, where each probe data point includes a location; determining, from the probe data points, a parking location of the vehicle on a road segment, where the relative location along the road segment on which the vehicle parked can be determined; and estimating availability of other parking spaces along the road segment based on the relative location.

30 Claims, 5 Drawing Sheets

METHOD, APPARATUS, AND COMPUTER PROGRAM PRODUCT FOR PARKING AVAILABILITY ESTIMATION BASED ON PROBE DATA COLLECTION

TECHNOLOGICAL FIELD

An example embodiment of the present invention relates to estimating the availability of parking spaces proximate a destination, and more particularly, to using historical vehicle probe data to estimate the availability of parking spaces based on time and location.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services.

BRIEF SUMMARY

A method, apparatus, and computer program product are provided in accordance with an example embodiment described herein for predicting parking availability for one or more road segments based on the map-matched probe data points. In an example embodiment, a method is provided that includes: receiving probe data points from a vehicle, where each probe data point includes a location; determining, from the probe data points, a parking location of the vehicle on a road segment, where the relative location along the road segment on which the vehicle parked can be determined; and estimating availability of other parking spaces along the road segment based on the relative location. Methods may include matching a position of the vehicle to a data representation of the road segment, where the data representation of the road segment is contained in a geographic database that represents a road network in a geographic area in which the vehicle is located, where the geographic database is stored on a computer-readable storage medium accessed by a processor and the computer program code. Methods may optionally include: averaging, over a time window, an estimate of parking availability; and generating historical patterns of parking availability from said averaging.

According to some embodiments, a greater portion traversed by the vehicle relative to the total length of the road segment corresponds to a lower estimated availability of other parking spaces along the road segment, and a lower portion traversed relative to the total length of the road segment corresponds to a higher estimated availability of other parking spaces along the road segment. Methods may include providing data about the availability of other parking spaces along the road segment to another vehicle. Methods may optionally include: performing the determining and estimating operations for a plurality of vehicles that parked along the road segment; and determining a refined estimate of availability of other parking spaces along the road segment based on plural vehicles that parked along the road segment. The refined estimate of availability of other parking spaces along the road segment may be determined based on plural vehicles that parked along the road segment within a predetermined window of time.

Methods may include: map-matching the probe data points to a plurality of links representing road segments; generating a track comprising the plurality of links; extracting a portion of the track comprising a subset of the links of the track that are within a predetermined distance of the parking location; and determining a behavior indicative of a driver of the vehicle searching for a parking space. Determining a behavior indicative of a driver of the vehicle searching for a parking space may include: determining a number of optimal turns of the track to the parking location from the point at which the track becomes a predetermined distance from the parking location; determining a number of sub-optimal turns of the track to the parking location from the point at which the track becomes a predetermined distance from the parking location; and determining the behavior indicative of the driver of the vehicle searching for a parking space in response to the number of sub-optimal turns of the track to the parking location exceeding a predefined ratio relative to the number of optimal turns of the track to the parking location. A turn between a first link and a second link may be determined to be optimal in response to the second link being closer to the parking location than the first link, and where a turn between a first link and a second link is determined to be sub-optimal in response to the second link being further from the parking location than the first link.

Embodiments of the present invention may provide an apparatus including at least one processor and at least one memory including computer program code. The at least one memory and computer program code configured to, with the processor, cause the apparatus to at least: receive probe data points from a vehicle, where each probe data point includes a location; determine, from the probe data points, a parking location of the vehicle on a road segment, where a relative location along the road segment that the vehicle parked can be determined; and estimate availability of other parking spaces along the road segment based on the relative location. An apparatus of example embodiments may further be caused to match a position of the vehicle to a data representation of the road segment, where the data representation of the road segment is contained in a geographic database that represents a road network in a geographic area in which the vehicle is located, where the geographic database is stored on a computer-readable storage medium accessed by a process and the computer program code.

According to some embodiments, an apparatus may be caused to: average, over a time window, an estimate of parking availability; and generate historical patterns of parking availability from said averaging. A greater portion of a road segment traversed relative to a total length of the road segment may correspond to a lower estimated availability of other parking spaces along the road segment, and a lower portion of the road segment traversed relative to the total length of the road segment may correspond to a higher estimated availability of other parking spaces along the road segment. The apparatus may be caused to provide data about the availability of other parking spaces along the road segment to another vehicle.

The apparatus of example embodiments may be caused to: perform the determining and estimating operations for a plurality of vehicles that parked along the road segment; and determine a refined estimate of availability of other parking spaces along the road segment based on plural vehicles that parked along the road segment. The refined estimate of availability of other parking spaces along the road segment may be determined based on plural vehicles that parked along the road segment during a predetermined period of time. The apparatus may be caused to: map-match the probe data points to a plurality of links representing road segments; generate a track comprising the plurality of links; extract a portion of the track including a subset of the links of the track that are within a predetermined distance of the parking location; and determine a behavior indicative of a driver of the vehicle searching for a parking space.

According to some embodiments, causing the apparatus to determine a behavior indicative of a driver of the vehicle searching for a parking space may include causing the apparatus to: determine a number of optimal turns of the track to the parking location from a point at which the track becomes a predetermined distance from the parking location; determine a number of sub-optimal turns of the track to the parking location from the point at which the track becomes a predetermined distance from the parking location; and determine the behavior indicative of the driver of the vehicle searching for a parking space in response to the number of sub-optimal turns of the track to the parking location exceeding a predefined ratio relative to the number of optimal turns of the track to the parking location. A turn between a first link and a second link may be determined to be optimal in response to the second link being closer to the parking location than the first link, and a turn between a first link and a second link may be determined to be sub-optimal in response to the second link being further from the parking location than the first link.

Embodiments of the present invention may provide a computer program product including at least one non-transitory computer-readable storage medium having computer-executable program code portions stored therein. The computer-executable program code portions including program code instructions configured to: receive probe data points from a vehicle, where each probe data point includes a location; determine, from the probe data points, a parking location of the vehicle on a road segment, where a relative location along the road segment that the vehicle parked can be determined; and estimate availability of other parking spaces along the road segment based on the relative location. The computer program product may include program code instructions to match a position of the vehicle to a data representation of the road segment, where the data representation of the road segment is contained in a geographic database that represents a road network in a geographic area in which the vehicle is located, where the geographic database is stored on a computer-readable storage medium accessed by a processor and the computer program code.

According to some embodiments, a greater portion of the road segment traversed relative to a total length of the road segment may correspond to a lower estimated availability of other parking spaces along the road segment, and a lower portion of the road segment traversed relative to the total length of the road segment may correspond to a higher estimated availability of other parking spaces along the road segment.

According to some embodiments, the computer program product may include program code instructions to: map-match the probe data points to a plurality of links representing road segments; generate a track including the plurality of links; extract a portion of the track including a subset of the links of the track that are within a predetermined distance of the parking location; and determine a behavior indicative of a driver of the vehicle searching for a parking space. The program code instructions to determine a behavior indicative of a driver of the vehicle searching for a parking space may include program code instructions to: determine a number of optimal turns of the track to the parking location from the point at which the track becomes a predetermined distance from the parking location; determine a number of sub-optimal turns of the track to the parking location from the point at which the track becomes a predetermined distance from the parking location; and determine the behavior indicative of the driver of the vehicle searching for a parking space in response to the number of sub-optimal turns of the track to the parking location exceeding a predefined ratio relative to the number of optimal turns of the track to the parking location.

Embodiments provided herein may include a map services provider system. The map services provider system may include a communications interface configured to receive probe data points from a plurality of probes, where each probe data point includes a location. The system may also include a processor, where the processor is configured to receive probe data points from a vehicle; determine, from the probe data points, a parking location of the vehicle on a road segment, where a relative location along the road segment that the vehicle is parked can be determined; and estimate availability of other parking spaces along the road segment based on the relative location. The processor may optionally be configured to match a position of the vehicle to a data representation of the road segment, where the data representation of the road segment is contained in a geographic database that represents a road network in a geographic area in which the vehicle is located, where the geographic database is stored on a non-transitory computer-readable medium accessed by a processor and the computer program code.

According to some embodiments, a greater portion of the road segment traversed before finding a parking location relative to a total length of the road segment may correspond to a lower estimated availability of other parking spaces along the road segment, and a lower portion of the road segment traversed relative to the total length of the road segment before the parking location is found may correspond to a higher estimated availability of other parking spaces along the road segment.

According to some embodiments, the processor may further be configured to: map-match the probe data points to a plurality of links representing road segments; generate a track including the plurality of links; extract a portion of the track including a subset of the links of the track that are within a predetermined distance of the parking location; and determine a behavior indicative of a driver of the vehicle searching for parking. Determining a behavior indicative of a driver of the vehicle searching for a parking location may include causing the processor to: determine a number of optimal turns of the track to the parking location from the point at which the track becomes a predetermined distance from the parking location; determine a number of sub-optimal turns of the track to the parking location from the point at which the track becomes a predetermined distance from the parking location; and determine the behavior indicative of the driver of the vehicle searching for a parking location in response to the number of sub-optimal turns of the track to the parking location exceeding a predetermined ratio relative to the number of optimal turns of the track to the parking location.

BRIEF DESCRIPTION OF THE DRAWINGS

Figure 1:
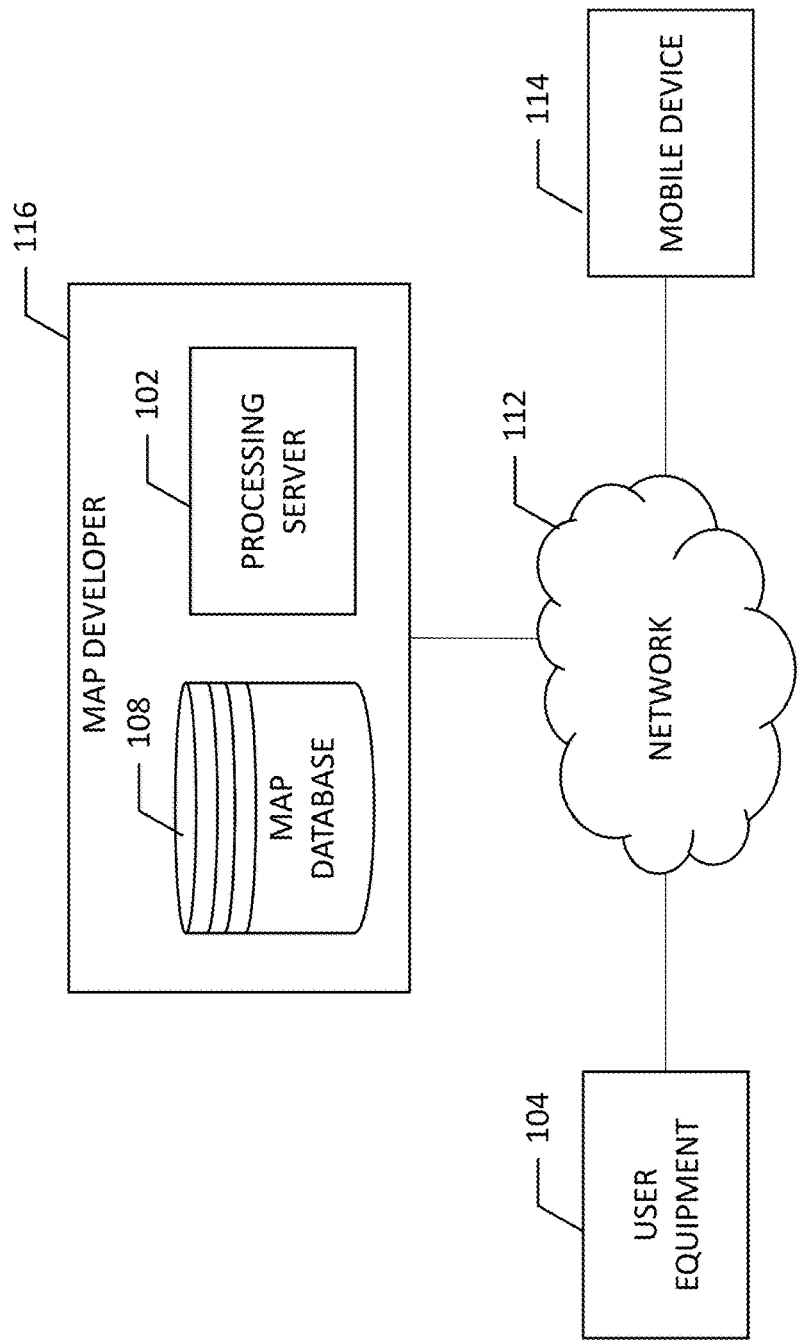
Figure 2:
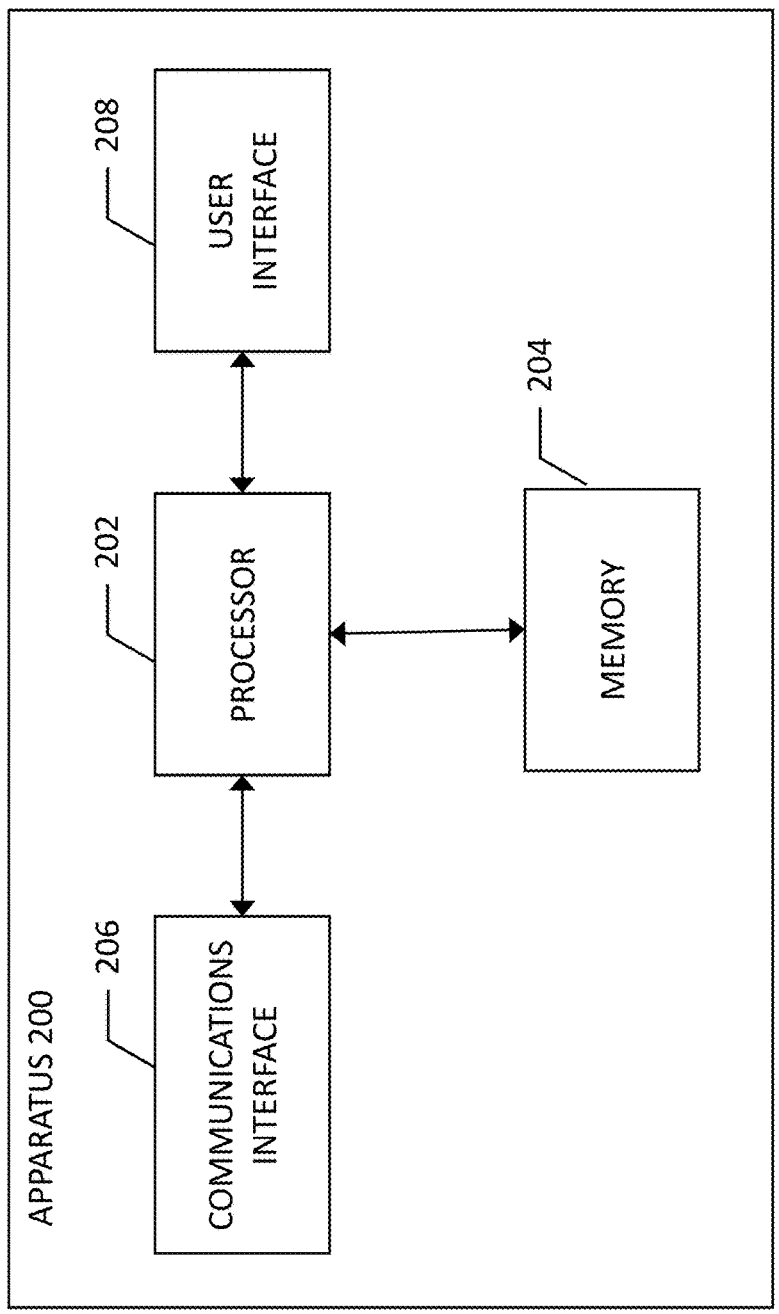
Figure 3:
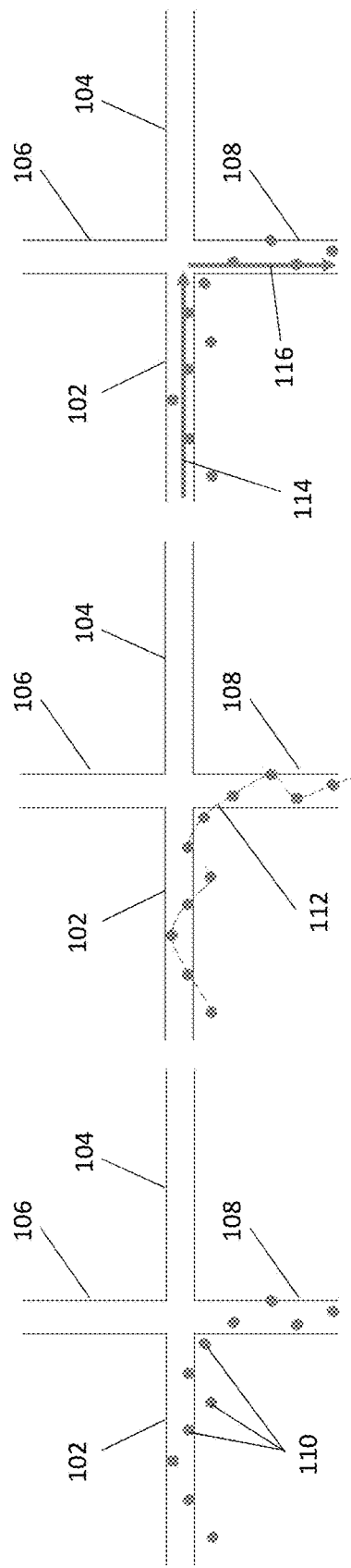
Figure 4:
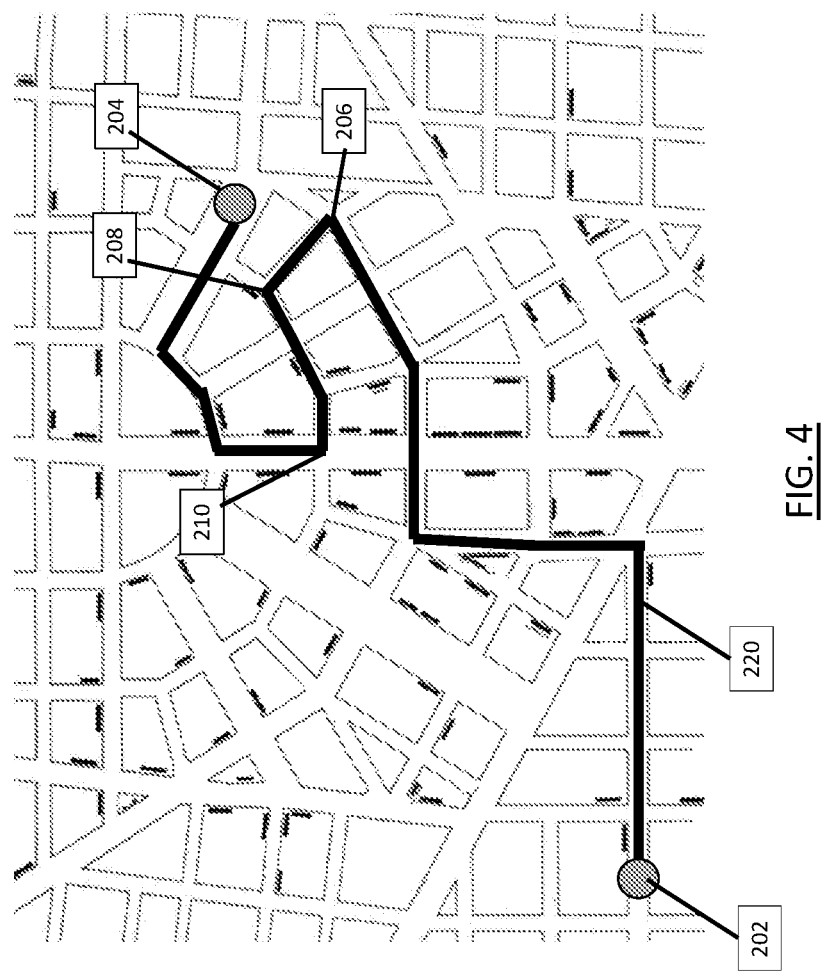
Figure 5:
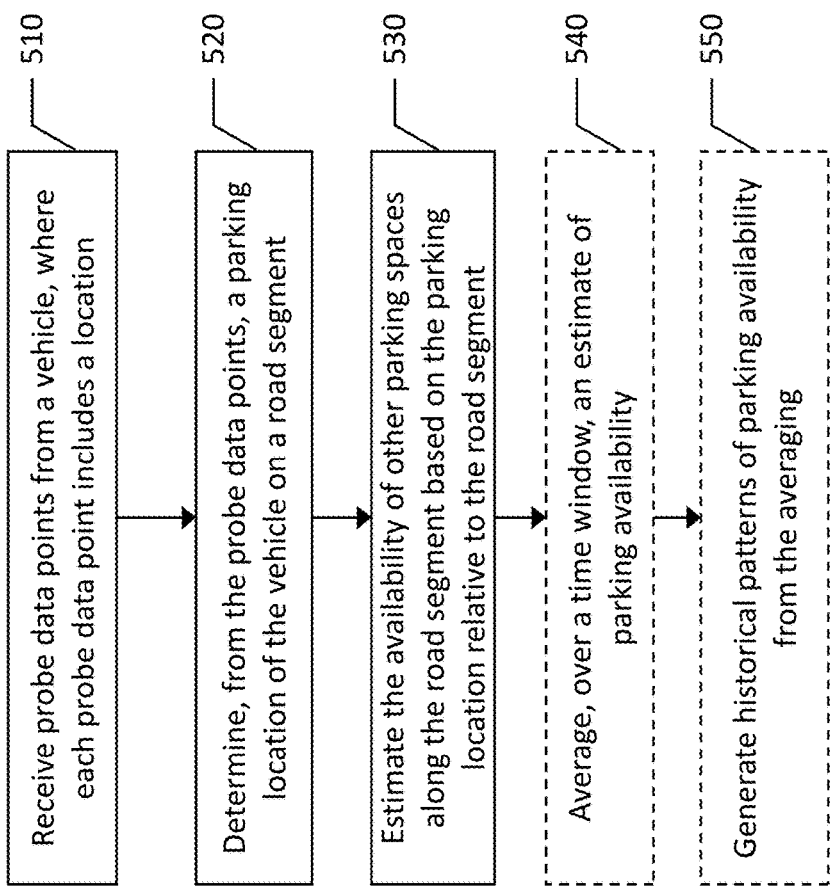

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for establishing a route from probe data points in accordance with an example embodiment of the present invention;

FIGS. 3A-3C illustrate map matching of probe data points to links representing road segments according to an example embodiment of the present invention;

FIG. 4 depicts a track of a vehicle exhibiting a cruising-for-parking behavior as established by example embodiments of the present invention; and FIG. 5 is a flowchart of a method for estimating parking availability along one or more road segments according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for using observed behavior from drivers searching for on-street parking to facilitate an estimation of parking availability along a particular road segment at a particular time of day, day of week, and season of the year, or during an event, such as a sporting event or entertainment event, for example. Finding a parking space can be time consuming and frustrating, particularly in city centers or other similar areas where parking spaces may be limited or the number of parkers is high. Historically, navigation systems (e.g., embedded car navigation systems) may offer assistance in these situations by indicating parking facilities (e.g., surface parking lots, parking garages, etc.) that are nearby. The presentation of parking facilities may be triggered when a driver or user approaches a known or predicted location. However, if the destination is not known or cannot be predicted accurately, the systems may not be providing information relevant to the user. Moreover, the presentation of available parking facilities may not provide information on parking availability within those facilities or relate to street parking availability.

To provide an improved manner of predicting parking availability for a particular road segment, and particularly on-street parking, a system as illustrated in FIG. 1 enables the ability to discern information about the availability of parking spaces based on gathered probe data from numerous tracks or journeys. A track, as defined herein, may include a plurality of time-sequenced road segments based on map-matched probe data points that define a path taken by a vehicle. The probe data points include both a time and a location, such that a track can be established from the probe data through the map-matching of probe data points to road segments that make up the track. In an example embodiment, for each journey taken by a vehicle probe data can be collected to determine a track of the vehicle traveling on a road or travel network. The system of FIG. 1 can identify at least one point on the track defining when a vehicle (or user thereof) initiates a parking search.

FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. Further, data may be compiled relating to parking space availability along different road segments of the map database, where a parking availability estimation may be generated in dependence of time of day, day of week, season of the year, special events, etc. The navigation-related functions can correspond to vehicle navigation, pedestrian navigation, or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for estimating parking availability along road segments based on a time of day, day of week, season of the year, etc. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for estimating parking availability along a particular road segment for a particular time period. Vehicle data may be collected through probes which collect data points in the form of an ordered list of GPS (global positioning system) locations where the vehicle has traveled and a time associated with each GPS location. Additional data may be included with probe data, such as vehicle identification, environmental conditions, or the like; however, for purposes of the invention described herein, the probe data may at least include location and time, while other data may be superfluous. The time associated with probe data may include date and time, while the GPS location may include coordinates, such as longitude and latitude of the location. The probe data, through map-matching to links representing road segments, may form a track for a particular probe or vehicle associated with the probe.

Map data, such as the map data contained in map database 108 of the map developer or map service provider 116 may include links, where each roadway in a mapped network comprises a series of interconnected links. Each link is associated with attributes about the geographical segment that they represent. A link may include link geometry data that is a list of coordinates that represent the geographical entity. Links may also include a total length of the geographic segment they represent. The total network of links may be represented as L, where each link may be represented as l, such that a single network link is represented as l ∈ L. As a vehicle traverses a road network, the probe data points gathered may each be associated with a link l, such that the traveled path represented by the probe data points can be represented by a series of links to which the probe data points are mapped.

Each link $l_i$ is associated with the probe data points that were mapped to that specific link, such that a path of probe data points, which may not always closely track a roadway, are associated with a roadway. FIGS. 3A-3C illustrate a simplified example embodiment of map-matching through associating probe data points with links. Roadways 102, 104, 106, and 108, each include one or more links independent of one another. Probe data points 110 illustrated in FIG. 3A may represent raw data points from a probe of a vehicle traveling along roadway 102 and turning onto roadway 108. The probe data points include position errors which may result from erroneous signals, obstructions (e.g., in urban caverns between buildings), etc. Rather than tracing a route represented by the probe data points as shown at 112 in FIG. 3B, each probe data point is associated with a road segment or link as shown in FIG. 3C, where the probe data points are mapped to link 102 at 114, and to 108 at 116.

Road segments represented by links can be used in calculating a route or recording a route as traveled. Nodes are end points corresponding to the respective links or segments of the road. Road link data records and node data records may be stored, for example, in map database 108, and may represent a road network. Road links and nodes can be associated with attributes such as geographic coordinates, street names, address ranges, speed limits, turn restrictions at intersections, and other navigation related attributes, as well as points of interest (POIs), such as traffic controls (e.g., stoplights, stop signs, crossings, etc.), fuel stations, hotels, restaurants, museums, stadiums, offices, repair shops, buildings, stores, parks, etc. The map database 108 can include data about places, such as cities, towns, or other communities, and other geographic features, such as bodies of water, mountain ranges, etc. Such place or feature data can be part of POI data or can be associated with POIs or POI data records.

A track may be defined as an ordered list of links $L\{l_0, l_1, \ldots, l_n\}$ which is the result of a map-matching process that maps GPS probe data points to the links of the network representing a map. Each link of a track includes or is associated with the attributes of the probes that were mapped to the link. Those attributes may include a date and time that the probe data point was generated and a traversed distance along the link that is the total distance that the vehicle traveled along the link. Tracks may optionally trim lingering or trailing traces that exist after a vehicle has reached a destination or point proximate a destination, such as a parking spot. Tracks may include links representing road segments from the beginning of a user's journey until the end. However, for purposes of the present invention, the entire journey may not be relevant to the determination of parking availability.

An example embodiment in which a lingering or trailing trace may be trimmed may include where probe data is generated by a mobile device, such as a cellular phone or "smart phone." In such an embodiment, the user may carry the device with them once they have parked their vehicle. Instead of treating this pedestrian activity as vehicle activity, the pedestrian portion may be trimmed as it may not be relevant to the determination of where and when a parking space for the user's vehicle was found. In order to determine pedestrian activity (e.g., walking) from vehicle activity (e.g., driving), a method may include determining a position of the mobile device relative to a link or road segment. While GPS data may include a margin of error on location, pedestrian activity may be established based on a device location (e.g., probe data) indicating that the mobile device or probe is moving or has moved orthogonal to a link or road segment. Optionally, if probe data suggests that a user is moving along a road link in a direction opposite to that which they were just traveling, the data may suggest that the user has exited the vehicle and is walking along the road link, such as on the sidewalk. In either case, a determination may be made that the vehicle associated with the probe data has been parked in an available parking space.

Example embodiments provided herein use observed behavior from vehicles, which may be driven by a user, autonomous, or semi-autonomous, while searching for on-street parking. This behavior can be qualified as a greedy random walk of the road network within a predefined radius around a desired destination. The predefined radius may be determined based on the maximum distance a user of the vehicle is willing to walk from the parked vehicle to the destination. Once a vehicle (or user thereof) starts to look for available parking, they will navigate the road network around the destination, potentially in a random or pseudo random manner. Upon locating an available parking spot, the vehicle will be parked in the spot as opposed to waiting for a better spot, since the risk of not finding another spot likely outweighs the benefits of finding an available parking spot closer to the destination in terms of the time invested in a search for an available parking spot. This behavior is presumed for purposes described herein as this is the more common behavior in finding an available parking space for a vehicle.

This relatively simple search behavior for an available parking space can be exploited to extract parking availability information from tracks generated by probe data points mapped to road links. Through a process of noting which road links a vehicle or user thereof explores while looking for an available parking space, the methods described herein can infer which links are at maximum parking capacity, as the presumed behavior dictates that a vehicle would have parked at an available space had there been one.

Embodiments can build on the analysis of driver behavior to estimate how many parking spaces are available on a road link that is chosen by a user based on the average length the vehicle traverses of the total length of the link before finding a suitable available parking space. As the presumed behavior dictates that a user will park in the first available spot on the link, the farther on average a vehicle travels along the road link they park on, the fewer available parking spaces are presumed. Estimated available parking spaces can be averaged over a given time window to generate historical patterns from the observations and to better facilitate future estimations having similar characteristics of time of day, day of week, season of year, or special event status (e.g., sporting or entertainment events).

Algorithms described herein according to an example embodiment of the present invention may benefit from the existence of a database of probe tracks that have been map-matched up to the approximate location of the parked vehicle associated with each track. Once a vehicle is parked, the lingering or trailing traces due to noise or user behavior may be trimmed from the track as they do not add substance to the data. Further, as algorithms described herein are directed to parking space availability estimation and determination, portions of the tracks that are well before a driver begins contemplating a parking location or space may not be relevant. Thus, tracks may include the final location of a parked vehicle and back to a point on the track that is a predetermined distance away from the destination of the track.

The destination, as described herein, may typically include a location that is the target of a route for a user. The destination may be any location (e.g., address, POI, latitude/longitude pair, etc.) or the destination may be where the user parks their vehicle. The predetermined distance from the destination from which a track is considered for purposes of the algorithm described herein may be a fixed distance, such as two kilometers, or a distance that is variable based on the location and characteristics thereof. For example, when the destination is in a dense, urban location, the predefined distance may be reduced as it may be unlikely that a person will begin looking for a parking space two kilometers from their destination. The distance may optionally be dependent upon typical parking availability proximate a location. In an example embodiment in which parking is typically widely available within 200 meters of a particular destination, the predetermined distance may be reduced to 500 meters. Consequently, in an example embodiment in which parking proximate a location is typically extremely sparse for a radius of one or two kilometers (e.g., proximate a stadium during a sporting event), the predetermined distance may be increased to three kilometers.

The portion of the track between the predefined distance from the destination and the destination may be referred to as the "last leg" of the track and may include a portion of the track including a subset of the links of that track that are within the predetermined distance of the destination. In an instance in which a track comes within a predetermined distance of the destination, but then moves further than the predetermined distance from the destination before again returning to within the predetermined distance, the last leg may include the track portion beginning when the track initially comes within a predetermined distance of the destination, as the apparent "wandering" of the track may suggest that a hunt for a parking space of a "cruising for parking behavior" has already begun.

According to example embodiments described herein, these last legs of the tracks may be separately stored in a dataset, and each track may include a time of arrival indicative of when a parking space was found. Each track in the database include the time of arrival timestamp and an ordered list of links $l_0 \ldots l_n$, where $l_n$ is the destination link of the track (e.g., the link where a parking space was found).

For all $i \in \{0, 1, \ldots, n-1\}$, $l_{i,l_i,datetime}$freeSpots=0,
The number of spaces available is established as zero since the driver was not able to park. Said differently, for each link in the set of links traversed by the driver during which time it is estimated that the driver is cruising for parking, if it is not the final link, it is presumed that there are no available parking spaces.

Once the driver reaches the destination link $l_n$, per the greedy driver hypothesis where a driver will take an available spot rather than continuing to search, the available parking spot reported is a function of how far the driver traversed the destination link before stopping. This can be represented by the formula below:

$$l_{n,l_n,datetime}.freeSpots = \frac{l_{n,t}.length}{l_{n,t}.traversedDistance} - 1$$

This formula provides an estimate of the number of free parking spaces along a given link based on the distance along the link a driver drove before parking. If a driver found a space quickly, after traversing only ten percent of the length of the link, it may be presumed that considerably more parking spaces are available along that link. Conversely, if a driver has traversed 90% of the length of a link before finding a parking space, it may be presumed that few parking spaces if any remain available along that link.

Historical patterns of driver behavior and parking behavior may inform parking estimation at a given point in time. Available parking observations that occur on the same epoch and the same link may be aggregated to approximate the expected traversal distance to an available parking spot on the link at the given epoch. For a given link, the free parking spot prediction at an epoch "e" can be calculated by the following formula:

$$l_{i,e}.freeSpots = \frac{l_i.length}{\sum_{j=1}^{n} l_{i,e,j}.traversedDistance/n} - 1$$

In some instances, there may not be sufficient data to generate such estimates, when the estimates are for a given epoch. In such a case of insufficient data, a prediction may be omitted for the distance along which it is anticipated that a driver must drive to find an available parking space.

According to an example embodiment, probe data points from a particular probe may be received, such as at processing server 102 from mobile device 114. From the probe data points, a parking location may be established. This parking location may be established based on an evaluation of probe data where trailing data may be eliminated, such as when it is determined that a user has parked their vehicle and is proceeding on foot to their final destination. The probe data points proximate the parking location may be map-matched to a link representing a road segment, such as via processing server 102 referencing map database 108. The map database 108 may include information such as the total length of the link along which the parking location was established or the "final link". The processing server may determine, based on the probe data, the portion of the final link that was traversed by the driver before they arrived at their parking space. As a driver is more likely to take the first parking space encountered, the amount of the link traversed is established by the processing server 102 as the length of road traveled before encountering an available parking space. If the parking space was encountered quickly, there may be a plurality of available spaces along that road segment. If the parking space was encountered only after the user had traversed most (e.g., 90%) of the road segment, parking availability may be established as low since the driver didn't find an available parking space sooner.

While the aforementioned parking availability estimation is premised on a single parking event, in practice, many data points may be gathered to provide a more robust estimation of parking availability along a particular link during a particular epoch. For example, along a particular link, it may be established that at 7:00 am on a non-special-event weekday, drivers typically traverse 20% of the link before finding a parking space, while at 9:00 am, drivers typically traverse 90% of the link before finding a parking space. Gathering multiple data points regarding this link enables a robust approximation of the available parking on the link during that epoch.

An epoch may include a time window that is appropriate for a given situation. For example, an epoch may include a "weekday morning rush hour" epoch which includes only a window of time, such as between 7:00 am and 9:00 am on weekdays (e.g., excluding Saturday and Sunday). Optionally, an epoch may include a seasonal type epoch, such as a "Summer" epoch or a "Winter" epoch, where parking proximate a beach may be widely available in Winter, but sparse in Summer. Epochs may include various parameters, such as season, time of day, day of week, special events (sporting or entertainment events), holidays, or any other temporal identifiers that may distinguish one point in time from another.

The aforementioned example embodiments may be used during a period in which a driver is determined to be cruising for parking. However, the determination of such behavior may be important to accurately estimate available parking based on driver behavior. Drivers heading to a known destination will tend to reduce the distance between themselves and their destination with the majority of new links they visit. That is, the number of optimal turns will generally exceed the number of wrong turns. An optimal turn is defined as a turn from a first link to a second link, where the second link is closer to the destination than the first link. In the event that the second link is further from the destination, the turn is defined as a sub-optimal turn or possibly a "wrong turn". However, this may not be the case for every turn, as detours and sub-optimal turns may take place in an otherwise optimal route. During the last leg of a trip, this assumption no longer holds, and the track is said to exhibit the characteristics of a cruise for parking condition or behavior by the driver.

Detecting cruising for parking behavior may become a matter of finding what the expected optimal turn ratio is for a track with no cruising behavior. Tracks with a last leg well below the expected ratio of optimal turns to sub-optimal turns can be considered cruising for parking. Tracks with no cruising behavior can be generated from probe data by considering the optimal turn ratio of the track during the drive. To calculate the optimal turn ratio of a track, only the portion of the track that begins a predetermined distance from the destination may be considered. For each intersection, the shortest distance between the vehicle and the destination may be calculated and recorded. The intersections are then traversed in pairs in order of route traversal. For each pair where the shortest network distance to the track's destination of the previous intersection is larger than the next intersection, an optimal turn is reported. The optimal turn ratio of the last leg may be the count of all optimal turns reported in the last leg divided by the count of all intersection pairs traversed in the last leg of the track, for example.

FIG. 4 illustrates an example embodiment of a track indicative of "cruising for parking" behavior. The track is illustrated between origin 202, or the location within the predefined distance from the destination that has been extracted as the "last leg" of the track 220, and the destination 204. The destination 204 is established as the location where the vehicle was parked. The track 220 to the destination 204 includes a series of turns, with some being optimal and others being sub-optimal. The turns are optimal as in they are each getting nearer to the destination 204 until turn 206, which is a sub-optimal turn since it does not get the track closer to the destination. Turns 208 and 210 are also determined to be sub-optimal. In the illustrated embodiment, there are five optimal turns, and three sub-optimal turns 202, 208, and 210. This ratio of optimal turns to sub-optimal turns (or sub-optimal turns to optimal turns) may satisfy a predetermined ratio which indicates that "cruising for parking" behavior. Conversely, if probe data includes few or no sub-optimal turns, particularly if the ratio of sub-optimal turns to optimal turns does not satisfy a predetermined value, then it may be established that there was no cruising for parking behavior, and the track may not be considered for establishing parking availability estimations.

FIG. 5 illustrates a flowchart illustrative of a method according to example embodiments of the present invention.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 illustrates a method of estimating parking availability along a road segment according to an example embodiment of the present invention. As shown, probe data points from a vehicle may be received at 510, where each probe data point includes a location. At 520, a parking location of the vehicle may be determined from the probe data points. Using this information, an estimate of the availability of other parking spaces along the road segment based on the parking location relative to the road segment. According to some embodiments, an estimate of parking availability may be generated based on an average parking availability during a time window as shown at 540. This time window may be an epoch, as described above, and the estimated parking availability may be used by other drivers to determine where they will search for parking. According to some embodiments, historical patterns of parking availability may be generated from the averaging such that parking can be more consistently and accurately predicted for certain periods of time in the future, as shown at 550.

In an example embodiment, an apparatus for performing the method of FIG. 5 above may comprise a processor (e.g., the processor 202) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 202 and/or a device or circuit for executing instructions or executing an algorithm for processing information as described above.

In the context of a navigation application, the parking availability predictions from certain example embodiments of the invention may be utilized. Said navigation application may run in a mobile device application, in an embedded vehicle navigation/infotainment system, be provided as a service, and/or a network-based user interface such as a web page over a communications network, or the like. A user planning a route may enter a destination (e.g., Invalidenstrasse 116, 10405 Berlin, Germany) in the navigation application's user interface (e.g., user interface 208 of FIG. 2). Based on a departure time, which may be presumed by the application to be immediate after receiving the route planning request, or may be independently entered by a user, the navigation application may calculate an estimated time of arrival for the destination. Based on the time of arrival, the application may query a prediction of parking space availability for an epoch matching the estimated time of arrival and for road links in the vicinity of the destination, and either A) return a route to a street/street segment in the vicinity of the destination where there is a higher probability of finding a parking space; or B) return a route to the destination, along with recommendations for streets/street segments where parking is more likely to be found, based on the reply received in response to the previous query. The aforementioned recommendations may be presented to the user as highlighted street/street segments on a user interface map view of the navigation view (e.g., highlighted on the map, or as a list of street/street segments where parking may be available). The recommendations may be ranked in order of likelihood of finding an available parking space, which may be conveyed to the user as a ranked list of streets/street segments, or as a color/color-intensity coded highlight on the map view of the navigation application.

According to some embodiments, another use case of parking availability predictions from certain example embodiments of the invention may be an "assisted cruising for parking behavior" situation, during which it is determined that a user is looking for an available parking spot. Parking behavior detection may be performed by means similar to those described above, though alternative parking behavior detection means may be used or parking behavior may be conveyed through user interaction of a user interface of a navigation application in which the user conveys their desire to park. Once parking behavior is determined, the navigation application may query a prediction of parking space availability for an epoch matching the current time/date/season/event/etc. and for road links in the vicinity of the current location (or destination, if known). The navigation application would then return recommendations for streets/street segments where parking is more likely to be found, based on the reply received in response to the previous query. The aforementioned recommendations may be presented to the user as highlighted street/street segments on a user interface map view of the navigation application (e.g., highlighted on the map, or as a list of streets/street segments where parking may be available). The recommendations may be ranked in order of likelihood of finding an available parking space, which may be conveyed to the user as a ranked list of streets/street segments, or as color/color-intensity coded highlights on the map view of the navigation application.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining parking availability, wherein the method is implemented by a processor including memory and computer program code, the method comprising:
   receiving probe data points from a vehicle, wherein each probe data point comprises a location;
   determining, from the probe data points, a parking location of the vehicle on a road segment, wherein a relative location along the road segment on which the vehicle parked is determined; and
   estimating availability of other parking spaces along the road segment based on the relative location.

2. The method of claim 1 further comprising:
   matching a position of the vehicle to a data representation of the road segment, wherein the data representation of the road segment is contained in a geographic database that represents a road network in a geographic area in which the vehicle is located, wherein the geographic database is stored on a computer-readable medium accessed by a processor and the computer program code.

3. The method of claim 1 further comprising:
   averaging over a time window an estimate of parking availability; and
   generating historical patterns of parking availability from said averaging.

4. The method of claim 1, wherein a greater portion of the road segment traversed by the vehicle relative to a total length of the road segment corresponds to a lower estimated availability of other parking spaces along the road segment, and a lower portion traversed relative to the total length of the road segment corresponds to a higher estimated availability of other parking spaces along the road segment.

5. The method of claim 1 further comprising:
   providing data about the availability of other parking spaces along the road segment to another vehicle.

6. The method of claim 1 further comprising:
   performing the determining and estimating operations for a plurality of vehicles that parked along the road segment; and
   determining a refined estimate of availability of other parking spaces along the road segment based on plural vehicles that parked along the road segment.

7. The method of claim 6 wherein the refined estimate of availability of other parking spaces along the road segment is determined based on plural vehicles that parked along the road segment within a predetermined window of time.

8. The method of claim 1, further comprising:
   map-matching the probe data points to a plurality of links representing road segments;
   generating a track comprising the plurality of links;
   extracting a portion of the track comprising a subset of the links of the track that are within a predetermined distance of the parking location; and
   determining a behavior indicative of a driver of the vehicle searching for a parking space.

9. The method of claim 8, wherein determining a behavior indicative of a driver of the vehicle searching for a parking space comprises:
   determining a number of optimal turns of the track to the parking location from a point at which the track becomes a predetermined distance from the parking location;
   determining a number of sub-optimal turns of the track to the parking location from the point at which the track becomes a predetermined distance from the parking location; and
   determining the behavior indicative of the driver of the vehicle searching for a parking space in response to the number of sub-optimal turns of the track to the parking location exceeding a predefined ratio relative to the number of optimal turns of the track to the parking location.

10. The method of claim 9, wherein a turn between a first link and a second link is determined to be optimal in response to the second link being closer to the parking location than the first link, and wherein a turn between a first link and a second link is determined to be sub-optimal in response to the second link being further from the parking location than the first link.

11. An apparatus comprising at least one processor and at least one memory including computer program code, the at least one memory and computer program code configured to, with the processor, cause the apparatus to at least:
   receive probe data points from a vehicle, wherein each probe data point comprises a location;
   determine, from the probe data points, a parking location of the vehicle on a road segment, wherein a relative location along the road segment that the vehicle parked is determined; and
   estimate availability of other parking spaces along the road segment based on the relative location.

12. The apparatus of claim 11 wherein the apparatus is further caused to:
   match a position of the vehicle to a data representation of the road segment, wherein the data representation of the road segment is contained in a geographic database that represents a road network in a geographic area in which the vehicle is located, wherein the geographic database is stored on a computer-readable medium accessed by a processor and the computer program code.

13. The apparatus of claim 11 wherein the apparatus is further caused to:
   average, over a time window, an estimate of parking availability; and generate historical patterns of parking availability from said averaging.

14. The apparatus of claim 11, wherein a greater portion of the road segment traversed relative to a total length of the road segment corresponds to a lower estimated availability of other parking spaces along the road segment, and a lower portion traversed relative to the total length of the road segment corresponds to a higher estimated availability of other parking spaces along the road segment.

15. The apparatus of claim 11, wherein the apparatus is further caused to:
provide data about the availability of other parking spaces along the road segment to another vehicle.

16. The apparatus of claim 11, wherein the apparatus is further caused to:
perform the determining and estimating operations for a plurality of vehicles that parked along the road segment; and
determine a refined estimate of availability of other parking spaces along the road segment based on plural vehicles that parked along the road segment.

17. The apparatus of claim 16 wherein the refined estimate of availability of other parking spaces along the road segment is determined based on plural vehicles that parked along the road segment during a predetermined period of time.

18. The apparatus of claim 11, wherein the apparatus is further caused to:
map-match the probe data points to a plurality of links representing road segments;
generate a track comprising the plurality of links;
extract a portion of the track comprising a subset of the links of the track that are within a predetermined distance of the parking location; and
determine a behavior indicative of a driver of the vehicle searching for a parking space.

19. The apparatus of claim 18, wherein causing the apparatus to determine a behavior indicative of a driver of the vehicle searching for a parking space comprises causing the apparatus to:
determine a number of optimal turns of the track to the parking location from a point at which the track becomes a predetermined distance from the parking location;
determine a number of sub-optimal turns of the track to the parking location from the point at which the track becomes a predetermined distance from the parking location; and
determine the behavior indicative of the driver of the vehicle searching for a parking space in response to the number of sub-optimal turns of the track to the parking location exceeding a predefined ratio relative to the number of optimal turns of the track to the parking location.

20. The apparatus of claim 19, wherein a turn between a first link and a second link is determined to be optimal in response to the second link being closer to the parking location than the first link, and wherein a turn between a first link and a second link is determined to be sub-optimal in response to the second link being further from the parking location than the first link.

21. A computer program product comprising at least one non-transitory computer-readable storage medium having computer-executable program code portions stored therein, the computer-executable program code portions comprising program code instructions configured to:
receive probe data points from a vehicle, wherein each probe data point comprises a location;
determine, from the probe data points, a parking location of the vehicle on a road segment, wherein a relative location along the road segment that the vehicle parked is determined; and
estimate availability of other parking spaces along the road segment based on the relative location.

22. The computer program product of claim 21, further comprising program code instructions to:
match a position of the vehicle to a data representation of the road segment, wherein the data representation of the road segment is contained in a geographic database that represents a road network in a geographic area in which the vehicle is located, wherein the geographic database is stored on a computer-readable medium accessed by a processor and the computer program code.

23. The computer program product of claim 21, wherein a greater portion of the road segment traversed relative to a total length of the road segment corresponds to a lower estimated availability of other parking spaces along the road segment, and a lower portion of the road segment traversed relative to the total length of the road segment corresponds to a higher estimated availability of other parking spaces along the road segment.

24. The computer program product of claim 21, further comprising program code instructions to:
map-match the probe data points to a plurality of links representing road segments;
generate a track comprising the plurality of links;
extract a portion of the track comprising a subset of the links of the track that are within a predetermined distance of the parking location; and
determine a behavior indicative of a driver of the vehicle searching for a parking space.

25. The computer program product of claim 24, wherein the program code instructions to determine a behavior indicative of a driver of the vehicle searching for a parking space comprise program code instructions to:
determine a number of optimal turns of the track to the parking location from a point at which the track becomes a predetermined distance from the parking location;
determine a number of sub-optimal turns of the track to the parking location from the point at which the track becomes a predetermined distance from the parking location; and
determine the behavior indicative of the driver of the vehicle searching for a parking space in response to the number of sub-optimal turns of the track to the parking location exceeding a predefined ratio relative to the number of optimal turns of the track to the parking location.

26. A map services provider system comprising:
a communications interface configured to receive probe data points from a plurality of probes, where each probe data point comprises a location; and at least one processor configured to:
receive probe data points from a vehicle;
determine, from the probe data points, a parking location of the vehicle on a road segment, wherein a relative location along the road segment that the vehicle parked is determined; and
estimate availability of other parking spaces along the road segment based on the relative location.

27. The system of claim 26, wherein the processor is further configured to:

match a position of the vehicle to a data representation of the road segment, wherein the data representation of the road segment is contained in a geographic database that represents a road network in a geographic area in which the vehicle is located, wherein the geographic database is stored on a computer-readable medium accessed by a processor and the computer program code.

28. The system of claim 26, wherein a greater portion of the road segment traversed relative to a total length of the road segment corresponds to a lower estimated availability of other parking spaces along the road segment, and a lower portion of the road segment traversed relative to the total length of the road segment corresponds to a higher estimated availability of other parking spaces along the road segment.

29. The system of claim 26, wherein the processor is further configured to:

map-match the probe data points to a plurality of links representing road segments;

generate a track comprising the plurality of links;

extract a portion of the track comprising a subset of the links of the track that are within a predetermined distance of the parking location; and determine a behavior indicative of a driver of the vehicle searching for a parking location.

30. The system of claim 29, wherein the processor configured to determine a behavior indicative of a driver of the vehicle searching for a parking location comprises configuring the processor to:

determine a number of optimal turns of the track to the parking location from a point at which the track becomes a predetermined distance from the parking location;

determine a number of sub-optimal turns of the track to the parking location from the point at which the track becomes a predetermined distance from the parking location; and determine the behavior indicative of the driver of the vehicle searching for a parking location in response to the number of sub-optimal turns of the track to the parking location exceeding a predefined ratio relative to the number of optimal turns of the track to the parking location.

* * * * *